N. ARESON.
SCAFFOLDING BRACKET FOR WOODEN SHIP BUILDING.
APPLICATION FILED JUNE 24, 1918.
1,303,148.
Patented May 6, 1919.
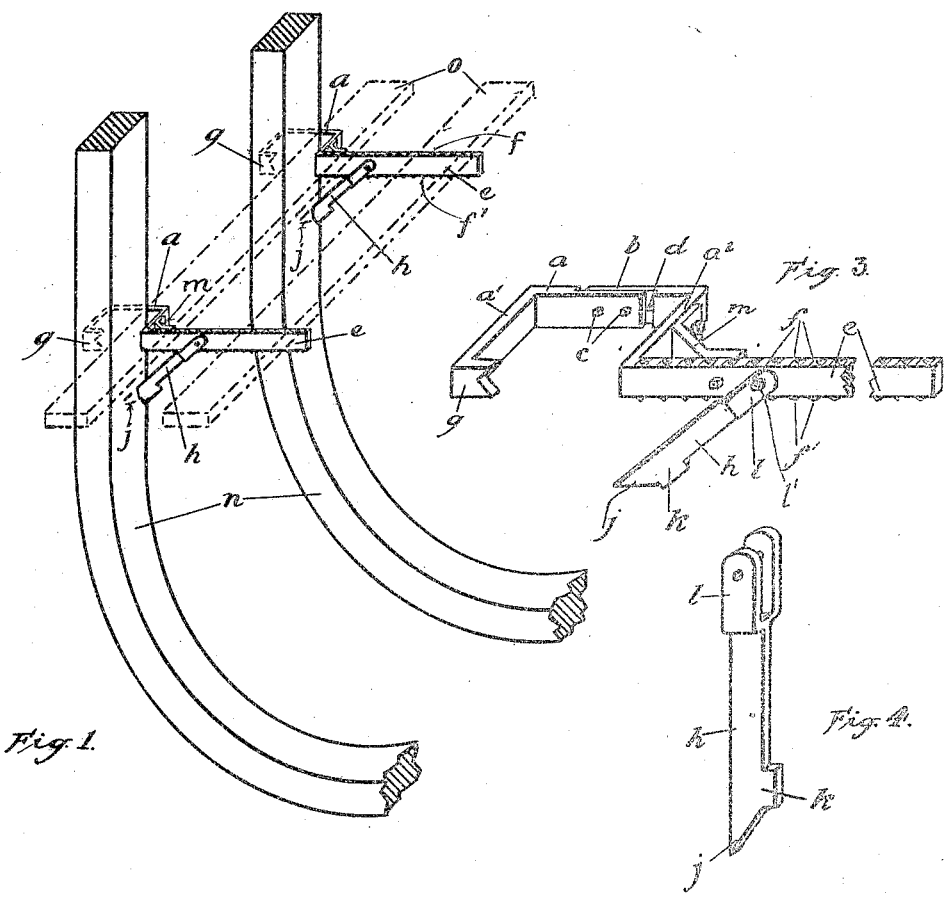
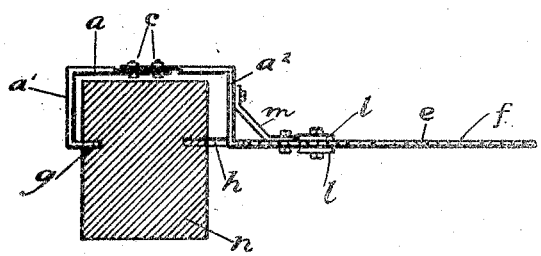

UNITED STATES PATENT OFFICE.

NELS ARESON, OF PORTLAND, OREGON.

SCAFFOLDING-BRACKET FOR WOODEN-SHIP BUILDING.

1,303,148.

Specification of Letters Patent.  Patented May 6, 1919.

Application filed June 24, 1918. Serial No. 241,704.

*To all whom it may concern:*

Be it known that I, NELS ARESON, a subject of the King of Norway, and a resident of the city of Portland, county of Multnomah, State of Oregon, have invented a certain new and useful Improvement in Scaffolding-Brackets for Wooden-Ship Building, of which the following is a specification.

My invention relates to the building of wooden ships, and the object thereof is to provide simply constructed, efficient brackets which may be readily affixed on the upright members of the ship's frame, and when so affixed will support scaffolding for the workmen to stand on. Also to so arrange these brackets that they may be readily moved up and down as required, and that the same brackets may be used on either side of the ship's frame, for supporting inside or outside scaffolding.

I attain my object as illustrated in the accompanying drawings, in which:

Figure 1 is a perspective view showing two ribs of a wooden ship frame to which my brackets are shown affixed, the brackets supporting the planks of the platform, the planks being shown in broken outline;

Fig. 2 is a plan section illustrating diagrammatically the manner in which my brackets are affixed to the upright frame members;

Fig. 3 is a larger-scale perspective detail of my bracket; and

Fig. 4 is a perspective detail of the dog constituting a part thereof.

My bracket comprises a main part, $a$, of rectangular form and preferably made of two members, $a'$, $a^2$, adjustable one over the other, as illustrated at $b$; bolts $c$ being inserted in the member $a'$ and projecting through the slot $d$ of the member $a^2$; nuts being affixed on the projecting ends of the bolts $c$ for clamping the members $a'$, $a^2$ in the position to which adjusted. The member $a^2$ is made with a laterally projecting part $e$, having serrations $f$, $f'$ (on its upper and lower faces) tending to hold the planks supported by my brackets against shifting sidewise or endwise. Said serrations are provided on the lower as well as the upper faces because my brackets are reversed when moved from one side of the ship's frame to the other. The member $a'$ is made with an interiorly projecting lateral dog $g$, and the member $a^2$ is made with a pendent, pivoted dog $h$. The latter is preferably constructed as illustrated in Fig. 4, comprising a forked upper end $i$ which straddles the part $e$. The lower end $j$ of the dog is made pointed, and it is provided with a tapping head or projection $k$, which also serves to limit the penetration of the point $j$ of the dog $h$ into the frame timber. The dog $h$ is removably fastened to the part $e$ by a bolt $l'$. The dog $h$ is made removable so that the same bracket may be used on either side of the ship's frame by simply adjusting the dog $h$ so that it will be arranged as illustrated in Fig. 3. The part $e$ may be an integral part of the member $a^2$, and it may be supported by an auxiliary brace $m$, bolted in place as shown in Fig. 3.

The manner of using my bracket is illustrated in Fig. 1. $n$ represents ribs of the ship's frame, to which are fastened my brackets. It will be noted that the dog $g$ bites into one side of the frame timber, and the dog $h$ into the opposite side. The projecting parts $e$ of the member $a^2$ have planks $o$ laid across them to provide a platform for the workmen. The dog $h$ may be slightly tapped into the frame timbers by striking the tapping head $k$ thereof with a hammer. When my bracket has once taken hold, the weight imposed thereon would have a tendency to tighten such hold. In order to remove the brackets, the tapping head $k$ of the dog $h$ may be slightly tapped on the under side. It is of course not necessary that the bracket $a$ be made of two members $a'$, $a^2$, such construction is only suggested where the bracket is intended to be used on frame timbers of varying cross-section; and hence, if preferred, the bracket may be made of one piece, including a reinforcing or bracing part corresponding to the part $m$ shown in Fig. 3.

I claim:

1. A scaffold bracket comprising a three-sided rectangular part having an integral piece projecting in the plane of the rectangle, the free end of the latter being made with an inturned pointed projection; and a leg pivoted to said projecting piece at a point located some distance from said rectangle, the free end of said leg being pointed.

2. A scaffold bracket comprising an adjustable three-sided rectangular part having an integral piece projecting in the plane of the rectangle, the free end of the latter being made with an inturned pointed projection, and a leg removably pivoted to said projecting piece at a point located some distance from said rectangle, the free end of said leg being pointed.

NELS ARESON.